(12) United States Patent
Tewari et al.

(10) Patent No.: US 8,813,060 B2
(45) Date of Patent: Aug. 19, 2014

(54) CONTEXT AWARE APPLICATION MODEL FOR CONNECTED DEVICES

(75) Inventors: Ritwik Tewari, Woodinville, WA (US); Dominique Fortier, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 13/162,612

(22) Filed: Jun. 17, 2011

(65) Prior Publication Data
US 2012/0324434 A1 Dec. 20, 2012

(51) Int. Cl.
*G06F 9/44* (2006.01)
*G06F 9/445* (2006.01)

(52) U.S. Cl.
USPC ............ 717/168; 717/120; 717/171; 717/174

(58) Field of Classification Search
CPC ................ G06F 8/61; G06F 8/65; G06F 8/71
See application file for complete search history.

(56) References Cited

U.S. PATENT DOCUMENTS

| | | | |
|---|---|---|---|
| 8,418,165 B2 * | 4/2013 | Hoff et al. ...................... | 717/168 |
| 8,458,690 B2 * | 6/2013 | Zhang et al. ................... | 717/171 |
| 8,627,284 B2 * | 1/2014 | Stritzel et al. .................. | 717/120 |
| 8,689,203 B2 * | 4/2014 | Parthasarathy ................ | 717/168 |
| 2002/0040272 A1 * | 4/2002 | Nagasaka et al. .............. | 701/211 |
| 2004/0209594 A1 * | 10/2004 | Naboulsi ..................... | 455/404.1 |
| 2005/0080902 A1 * | 4/2005 | Parupudi et al. .............. | 709/226 |
| 2005/0262428 A1 | 11/2005 | Little et al. | |
| 2006/0271910 A1 * | 11/2006 | Burcham et al. .............. | 717/105 |
| 2007/0300185 A1 * | 12/2007 | Macbeth et al. .............. | 715/825 |
| 2008/0005067 A1 | 1/2008 | Dumais et al. | |
| 2008/0172364 A1 | 7/2008 | Cucerzan et al. | |
| 2009/0055739 A1 * | 2/2009 | Murillo et al. ................. | 715/708 |
| 2009/0327401 A1 * | 12/2009 | Gage ............................. | 709/203 |
| 2010/0211941 A1 * | 8/2010 | Roseborough ................ | 717/170 |
| 2010/0229157 A1 | 9/2010 | Ergan et al. | |
| 2010/0251265 A1 | 9/2010 | Hodson et al. | |
| 2010/0257160 A1 * | 10/2010 | Cao ................................ | 707/723 |
| 2010/0330975 A1 * | 12/2010 | Basir ............................. | 455/418 |
| 2011/0016502 A1 * | 1/2011 | Pilla .............................. | 725/114 |
| 2012/0144386 A1 * | 6/2012 | Wookey ........................ | 717/174 |

FOREIGN PATENT DOCUMENTS

WO 2006-011900 A2 2/2006

OTHER PUBLICATIONS

Preda et al., Semantic context aware security policy deployment, Mar. 2009, 11 pages.*
Dobre et al., A Platform to Support Context-Aware Mobile Applications, 2013, 8 pages.*

(Continued)

*Primary Examiner* — Thuy Dao
(74) *Attorney, Agent, or Firm* — John Jardine; Andrew Sanders; Micky Minhas (57) ABSTRACT

An application management system is described herein that uses context information based on what the user is currently doing and what platform the user is using to determine which applications to offer to a user and to affect behavior of applications that the user invokes. The system provides a hardware/software driven policy manager coupled with context data in an application manifest to provide for device- and situation-specific application modes. Such a model leverages device-specific dynamics to create context aware installation, cataloging, management, interaction, and uninstallation of applications, hence providing better user engagement and experience. Thus, the application management system makes it easier for users to find relevant applications, configures applications to work well on the user's present device, and makes application experiences more relevant to what the user is currently doing.

20 Claims, 4 Drawing Sheets

(56) References Cited

OTHER PUBLICATIONS

"Market Filters", Retrieved at <<http://developer.android.com/guide/appendix/market-filters.html>>, Retrieved Date: Feb. 25, 2011, pp. 6.

Ejigu, et al., "Hybrid Approach to Collaborative Context-Aware Service Platform for Pervasive Computing", Retrieved at <<http://www.google.com/url?sa=t&source=web&cd=1&ved=0CBwQFjAA&url=http%3A%2F%2Fjs. academypublisher.com%2Findex.php%2Fjcp%2Fartice%2Fdownload%2F03014050%2F367&ei=ITFnTbeGHpK5hAf6o8zsDg&usg=AFQjCNE_64_pYB_sv3Va6n4C8n9svDPDSQ>>, Proceedings of the IEEE International Conference on Information Technology—Journal of Computers, vol. 3 No. 1 Jan. 2008, pp. 11.

Vale, et al., "Context-aware Model Driven Development by Parameterized Transformation", Retrieved at >>http://citeseerx.ist.psu.edu/viewdoc/download?doi=10.1.1.143.1009&rep=rep1&type=pdf>>, Proceedings of MDISIS, Retrieved Date: Feb. 25, 2011, pp. 13.

"Writing your First Marketplace App using PHP", Retrieved at <<http://code.google.com/googleapps/marketplace/tutorial_php.html>>, Retrieved Date: Feb. 25, 2011, pp. 15.

Allen, Jennifer, "Windows Vista Application Development Requirements for User Account Control Compatibility", Retrieved at <<http://msdn.microsoft.com/en-us/library/bb530410.aspx>>, Retrieved Date: Feb. 25, 2011, pp. 58.

"International Search Report", Mailed Date: Dec. 26, 2012, Application No. PCT/US2012/040959, Filed Date: Jun. 5, 2012, pp. 8. (MS# 332328.02).

\* cited by examiner

CONTEXT AWARE APPLICATION MODEL FOR CONNECTED DEVICES

BACKGROUND

Users of computer systems acquire software applications from a variety of sources today. Whereas traditionally software was distributed by selling boxed software with optical or other disks on a retail store shelf, today users may download software applications from the Internet, install applications provided by one or more application stores or repositories (e.g., the WINDOWS™ Marketplace, Ubuntu Software Center, and Mac App Store), receive applications via email, receive applications on a universal serial bus (USB) drive, and so forth. Software may still be purchased from a store, but has expanded from several well-known software companies to include many providers that may only make and sell one or two applications.

Application stores today often include hundreds of thousands of applications. Users have relatively few ways of determining which applications are interesting. Some application stores provide ratings of applications, sales rankings, categories, and search features for helping users to find applications. For example, a user may search for applications that other users have rated highly, for applications that are selling well, for applications with particular keywords in the description, and so forth. However, these may still result in a large number of applications through which the user sifts to find an appropriate application to complete the user's current goal.

Users may also use applications in wide variety of scenarios. For example, a single application store may include applications for desktop computers, mobile smartphones, car-based computer systems, and other types of devices. Application developers may provide multiple versions for running on each platform or may include selectable components that run on each platform. For example, a car version of an application may include a mobile interface, whereas a desktop version includes a keyboard/mouse interface. Alternatively, the application may include both interfaces in one version, and detect a platform that the application is running on to know which interface to use.

Once running, a user may use the application for a variety of purposes. For example, the user may run a Twitter application to gather read local news, to catch up with friends, to read celebrity news, to find out about events, and so forth. The application may include navigation features of its own to help the user whittle down the many functions that the user can perform with the application to one or two that the user is looking for. Often, the process of finding useful applications, configuring the application to work correctly on the user's platform of choice, and finding functionality within the application that is relevant to the user consumes significant time and can cause user frustration.

SUMMARY

An application management system is described herein that uses contextual information such as but not limited to what the user is currently doing and what platform the user is using to determine which applications to offer to a user and to affect behavior of applications that the user invokes. Different device categories bring with them unique modes of usage that fuel the need for a context sensitive application model for each of these categories. The system provides a hardware/software driven policy manager coupled with context data in an application manifest to provide for device- and situation-specific application modes. Such a model leverages device-specific dynamics to create context aware installation, cataloging, management, interaction, and uninstallation of applications, hence providing better user engagement and experience. The application manifest coupled with device-specific nuances can be used to provide for application categorization views inside an application marketplace. As applications run, the system provides context information to applications that may alter application behavior. The system also allows application developers to insert contextual information inside applications that is then used by the system to deliver applications and experiences in a policy aware manner. Thus, the application management system makes it easier for users to find relevant applications, configures applications to work well on the user's present device, and makes application experiences more relevant to what the user is currently doing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An application management system is described herein that uses contextual information such as what the user is currently doing and what platform the user is using to determine which applications to offer to a user and to affect behavior of applications that the user invokes. Context may also include information the system can gather about where the user is geographically located, who the user is with, or any other information that provides information about the specific situation of the user upon installing and/or launching an application. Different device categories bring with them unique modes of usage that fuel the need for a context sensitive application model for each of these categories. Conventional grid or icon based application models do not provide for a satisfactory experience since they fail to leverage the category specific dynamics. For example, a desktop computer platform has different capabilities than a tablet computer platform, which has different capabilities from an automotive platform. The system provides a hardware/software driven policy manager coupled with context data in an application manifest to provide for device- and situation-specific application modes. Such a model leverages device-specific dynamics to create context aware installation, cataloging, management, interaction, and uninstallation of applications, hence providing better user engagement and experience. The application manifest coupled with device-specific nuances can be used to provide for application categorization views inside an application marketplace. For example, consider a user watching a popular television show. If the user opens an application marketplace (or a launcher to start an already installed application) while watching the show, the system can detect what the user is doing (i.e., watching the show), identify applications with similar context information (e.g., related to the show), and rank applications based on matching the user's context and the application context information. This allows the system to present applications to the user that are related to the show the user is watching, such as a voting application for participating in a reality television show or a sporting event application for a sporting event the user is watching.

As applications run, the system provides context information to applications that may alter application behavior. For example, a news application that receives information that the user is in traffic may provide context-specific information related to traffic in the area. As another example, a social feed application that detects that a user is watching a television show may show the user comments from other users related to the show. The system provides a context aware configurable policy manager that governs application searching, installation, and execution and that is triggered by hardware and software events that provide context information. The system also allows application developers to insert contextual information inside applications that is then used by the system to deliver applications and experiences in a policy aware manner. Thus, the application management system makes it easier for users to find relevant applications, configures applications to work well on the user's present device, and makes application experiences more relevant to what the user is currently doing.

The application management system leverages device specific context to conceptualize each of these pillars in order to ensure a better user experience. For example, many devices include a single click installation experience today in which the user is not asked to answer any questions or navigate multiple pages of a wizard-like user interface to install an application. The application management system can operate with such devices to provide hardware/software driven policy management coupled with context sensitive data in an application manifest to provide for device specific application platforms while maintaining the single click install/uninstall experience. For example, in the case of a connected automobile, the system policy may prefer a voice-centric, minimal-touch/haptic control experience where the user installs applications much like a traditional smartphones but depending on the type of application the interaction is through either voice notifications sent to the car or voice-governed interaction.

Automotive applications lifetimes can be viewed in three broad categories: car still applications, car in motion smart notification applications, and standard car in motion applications. Car still applications have traditional free reign and are like applications users are accustomed to on a smartphone. These applications involve significant attention for interactions and thus can only be used when the car is still (or driving below a certain threshold), for safety reasons. Car in motion smart notification applications are applications that interact with the user via voice notifications powered by a two-way communication channel between the device and a cloud-based datacenter. The upstream path may include device and driver analytic packets delivered to the developer via a cloud-based API while the downstream path has notifications sent to the car. The information sent on the upstream path may be strictly controlled by the user's preferences and privacy settings. Standard car in motion applications are on device applications that run in the background with user interactions limited to voice commands. Examples could include Internet radio, podcasts, and news streaming services.

Applying the same principals to a connected set top box, the application management system attempts to focus application behavior on the user's content experience. Various types of applications may be created by developers for this context and managed by the system. For example, a programming-specific application is tied to a specific or a set of television programming, such as a "Seen On" application that allows for buying goods as seen on TV for specific programs. A category specific application addresses a specific genre or group of programming genres. Examples can include live twitter steams that target all live events and news items, voting and popularity applications that target all talent shows, virtual team/public sentiment applications that target sports programming, and similar application targeting for infomercials, reality television shows, and so on. A broadcasting company specific application can encompass (but not be limited to) post-programming engagement from content providers. Examples include a behind the scenes application, trivia, games, and so forth. The set top box may also run traditional applications, such as those not tied to programming on television, such as picture viewers, social networking applications, and so on.

Figure 1:
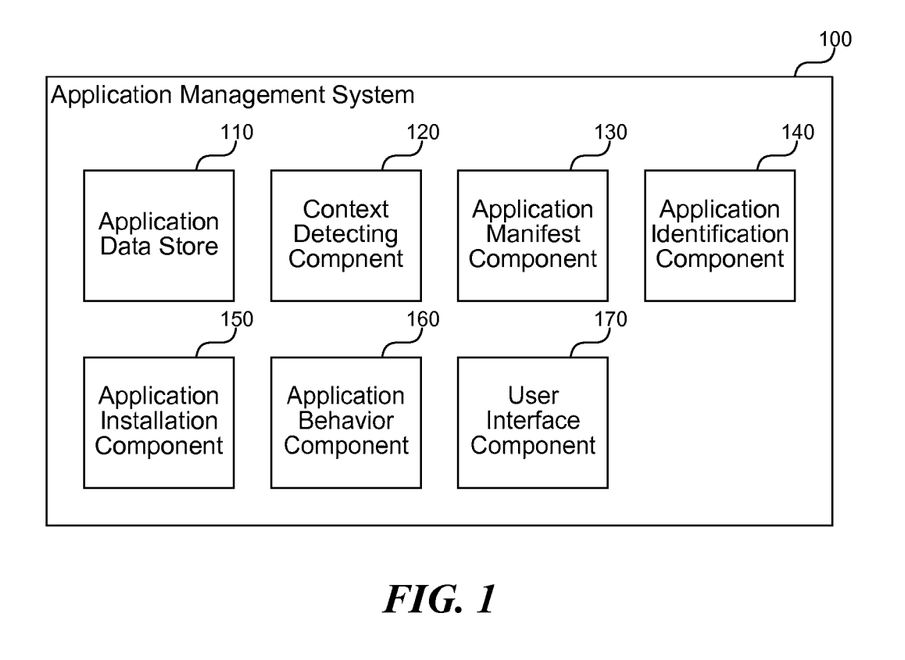
FIG. 1 is a block diagram that illustrates components of the application management system, in one embodiment.

FIG. 1 is a block diagram that illustrates components of the application management system, in one embodiment. The system 100 includes an application data store 110, a context-detecting component 120, an application manifest component 130, an application identification component 140, an application installation component 150, an application behavior component 160, and a user interface component 170. Each of these components is described in further detail herein.

The application data store 110 provides a repository of applications from which a user can select applications to install on the user's computing device. The data store 110 may include one or more files, file systems, hard drives, databases, web services, cloud-based storage services, and other facilities for persisting data. The data store 110 may receive applications from application developers and may include descriptive information, contextual tags, and other information associated with each application that helps users find the application and determine the application's purpose.

The context-detecting component 120 detects context information related to the computing device and one or more activities that the user is performing on the device. The component 120 may provide an event subsystem whereby one or more hardware or software components can indicate to the component 120 context information that may be relevant to applications. For example, on a set top box running the system, a television watching application may raise an event each time the user starts watching a new television program, so that the system can provide context information about the show the user is watching to applications, including an application browsing and installation application. The context information may include information from the user's calendar, identification of applications that are running, information that describes activities that the user is currently engaged in, and so forth.

The application manifest component 130 accesses and stores information associated with an application that describes contextual associations associated with the application. For example, an application related to a television show may include a contextual tag that identifies the television show. Similarly, applications may be related to public figures, specific user activities, books, movies, locations, or any other contextual association. The context information may be stored in a manifest that is a file or other metadata stored with or in association with the application itself. For example, the application data store 110 may store application manifests alongside applications.

The application identification component 140 identifies one or more applications for the user to install based on the detected user context information and the stored application manifest information. The component 140 determines relevance of each application in the application data store 110 to an activity the user is currently performing and may add weight to an application ranking for applications related to the user's current activity. For example, the component 140 may provide an application installation user interface through which the system 100 displays available applications to the user. The component 140 causes the system 100 to rank applications higher that are related to the user's current context. For example, if the user is at a particular store, the component 140 may rank an application associated with that store higher than other applications. This helps the user sort through the glut of applications to find those most relevant to the user's current activity.

The application installation component 150 installs a selected application and configures the application based on detected context information related to the computing device. Each computing device may include specific hardware, input paradigms, output paradigms, and platform expectations that the component 150 communicates to newly installed applications. Applications that provide a one-click or simplified application installation experience may not provide any opportunity for the user to configure the installed software before the software is first run. The application installation component 150 allows the application to configure itself based on context information provided by the system. For example, the application may set a touch interface as the default on a computing device without a mouse but having a touch screen.

The application behavior component 160 modifies application behavior at run time based on detected context information. An application may include a large amount of functionality, some of which is more relevant based on what the user is currently doing. For example, if the user opens a shopping application and is currently watching a show that sells items, then the shopping application can navigate to the item being sold in response to context information describing the item. As another example, if a user opens a voting application and is currently watching a television program that asks the user to vote, then the voting application may display voting options for the program upon launch. Similarly, in the car a navigation application may preload a route with information from a user's calendar that indicates the user's current destination (or a possible destination).

The user interface component 170 provides a user interface through which the user or an application developer can interact with the system to configure how context information is used. The application developer can upload an application along with application metadata that specifies a purpose of the application and contextual associations related to the application. A user may determine which applications respond to contextual information and what type of information is shared with third parties about the user. The user interface can provide these and other configuration settings to users of the system 100.

The computing device on which the application management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
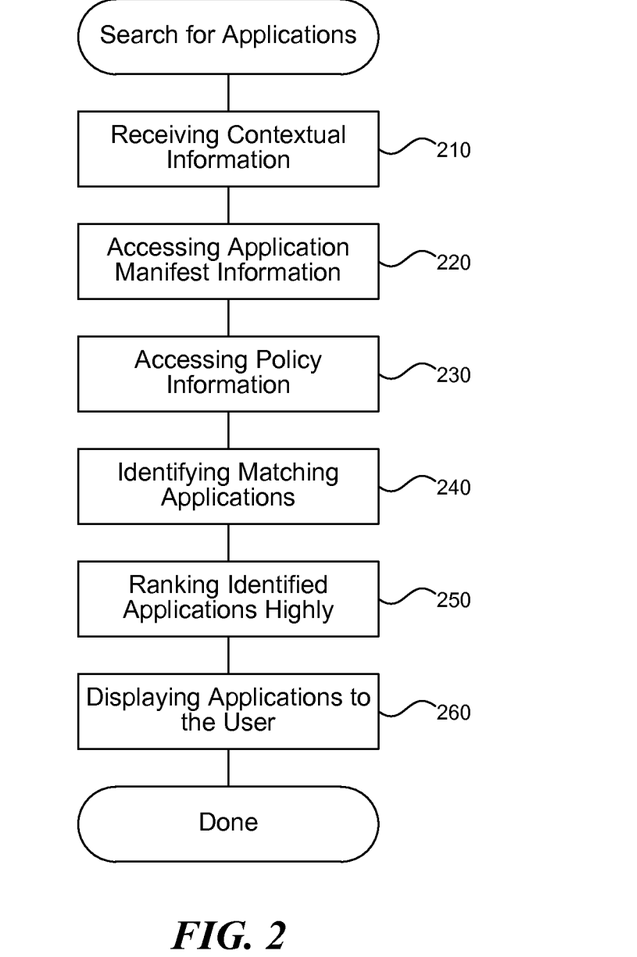
FIG. 2 is a flow diagram that illustrates processing of the application management system to search for applications considering contextual input information, in one embodiment.

FIG. 2 is a flow diagram that illustrates processing of the application management system to search for applications considering contextual input information, in one embodiment.

Beginning in block 210, the system receives contextual information that is related to a computing device or an activity that a user is engaged in. The system may receive contextual information from an event subsystem that notifies the system as new context information is available. Contextual information may be provided by hardware or software, and may include information about input/output devices attached to the computing device, capabilities of the computing device, actions happening with running software, installed software on the computing device, recent activity of the user, and so forth.

Continuing in block 220, the system accesses application manifest information for applications available from an application catalog. The application manifest information may be provided by the application's developer, reviewers, the catalog operator, or other parties. The manifest information describes a purpose of the application and any contextual associations that are related to the application. For example, if the application is associated with a television show, celebrity, sport, location, or any other association, the manifest can indicate this information to the system. The application catalog may expose an application-programming interface (API) through which the system can query the application manifest information.

Continuing in block 230, the system accesses policy information that determines how to match accessed application manifest information to the received contextual information related to the device and user. Policies may include privacy policies that protect user information, organizational policies related to device compliance with legal or other regulations, or preferences of an administrator or user for handling contextual information during the process of searching for applications. For example, the user may configure the system to avoid applications of a certain type (e.g., offensive, below a certain rating, and so on). The system may include default policy information that is applied when no more specific policy has been received.

Continuing in block 240, the system identifies one or more applications with manifest data that matches the currently detected context based on the accessed policy information. Matching may include looking for contextual associations of applications that match the detected user or device contextual information. The matching performed by the system can be used to only show applications compatible with the user's current device's capabilities, to show applications related to the user's current activity, to show applications that enhance the user's current activity, and so forth.

Continuing in block 250, the system ranks identified applications higher than other applications in the application catalog. The system may apply a weighting to applications and may weight applications with some contextual relationship higher than other applications. The system may also apply traditional criteria to narrow applications by rating, sales history, or other considerations.

Continuing in block 260, the system displays applications to the user based on the modified ranking produced by considering contextual information. This helps the user to find applications in a potentially very large application catalog that are most relevant to the user at the current time, based either on the device the user is using to access the catalog, an activity the user is engaged in, or both. For example, if the user is driving, the system may consider the context of an automotive computing device the user is using, the user's current location (e.g., based on global positioning system (GPS) receiver data), and a song the user is currently playing (e.g., using the same device as an MP3 player). After block 260, these steps conclude.

Figure 3:
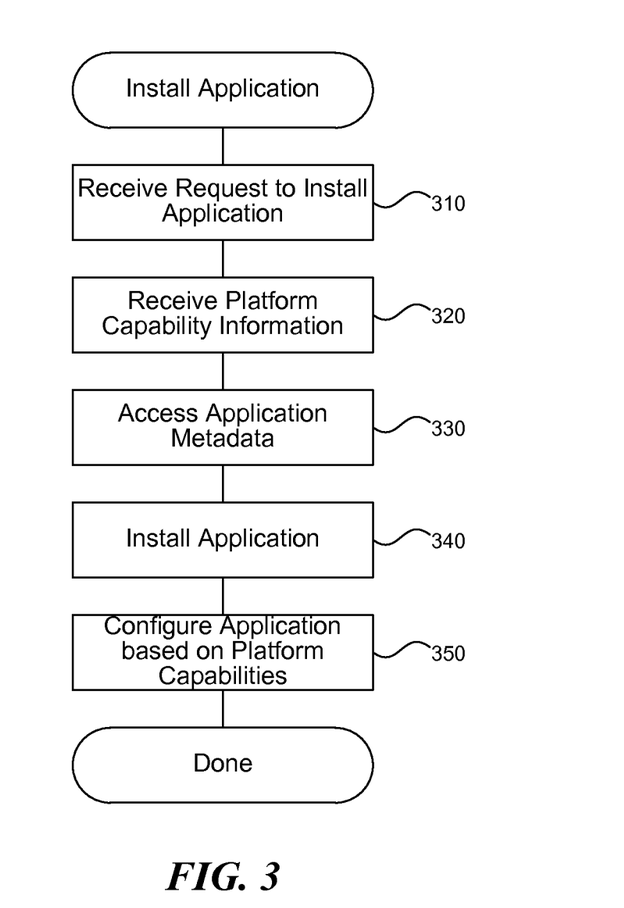
FIG. 3 is a flow diagram that illustrates processing of the application management system to install an application with configuration determined by contextual information, in one embodiment.

FIG. 3 is a flow diagram that illustrates processing of the application management system to install an application with configuration determined by contextual information, in one embodiment.

Beginning in block 310, the system receives a request to install an application. For example, the user may complete the process described with reference to FIG. 2, select an application, and request that the system install the application. The system receives an identification of the application to install along with any manifest information associated with the application. The system may provide the application with information related to the computing device on which the application is being installed. The application may be built conforming to an API for providing device context information so that the application can provide device-specific configuration actions that mold the application experience to suit the device on which the application is being installed. The configuration may include enabling, disabling, or selecting among available user interfaces, providing connectivity information to the application, registering contextual events provided by the application, and so on.

Continuing in block 320, the system receives platform capability information of a computing device on which the application is being installed. The capability information details available input devices, output devices, connectivity, configuration, and other contextual information. The capability information helps the application to know what functions of the application will and will not provide a satisfactory user experience on the current device. For example, the appropriate user interface for the application to use on a desktop computing device may differ substantially from the appropriate user interface on an automotive or set-top box device. Thus, the system provides platform capability information to the application.

Continuing in block 330, the system accesses application metadata. The application metadata may be provided by the application's developer, reviewers, users, or other parties through a manifest installed with the application or other accessible data. The application metadata describes a purpose of the application and any contextual associations that are related to the application. For example, if the application is associated with a television show, celebrity, sport, location, or any other association, the manifest can indicate this information to the system so that the system can provide relevant contextual information to the application as the application runs.

Continuing in block 340, the system installs the application on the computing device. Installation may include copying application binary files, resources, and other data as well as registering contextual events specified by the application metadata, setting system configuration settings, enabling application behavior that uses restricted services of the computing device (e.g., accessing the Internet or using location data), and so on. The system may inform other applications about the newly installed application so that the other applications are aware of any new context information.

Continuing in block 350, the system automatically configures the installed application based on the platform capability information of the computing device and accessed metadata associated with the application. The system may modify a configuration database, set initialization settings of the application, restrict actions of the application, and so forth. After block 350, these steps conclude.

Figure 4:
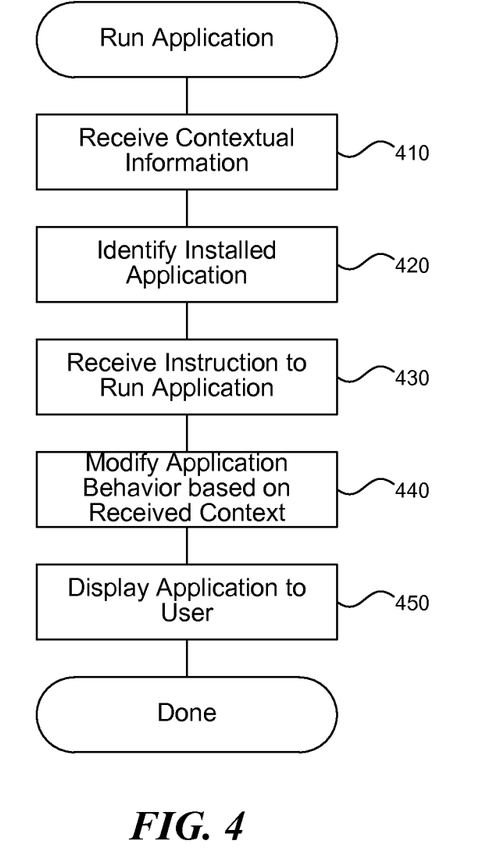
FIG. 4 is a flow diagram that illustrates processing of the application management system to provide contextual information to a running application, in one embodiment.

FIG. 4 is a flow diagram that illustrates processing of the application management system to provide contextual information to a running application, in one embodiment.

Beginning in block 410, the system receives contextual information that describes events taking place on a computing device. The events may include hardware or software events. The system provides an extensible event interface through which third parties can determine various types of contextual information to expose to applications. Applications may register to receive these events and can modify their behavior in response. For example, events may include indications of content the user is consuming, activities on the user's schedule, the device's location, a person the user is communicating with, recent activities of the user, and so forth. The system uses this information to tune behavior of the application to be more relevant to the user at any given time.

Continuing in block 420, the system identifies an installed application that modifies its behavior based on contextual information. The application may include a news application, shopping application, social networking application, information application, voting application, or any other type of application. The contextual information may allow the application to present relevant products, supplemental content, offers, or other items to the user as the user is performing a particular activity.

Continuing in block 430, the system receives an instruction to run the identified application. For example, the user may select the application from a user interface or the application may run automatically based on a schedule. Upon running the application, the system provides received contextual information to the application so that the application can modify its behavior based on the current context of the environment surrounding the application.

Continuing in block 440, the system modifies the identified application's behavior based on the received contextual information. For example, if the application is a voting application and the user is watching a trivia or voting-based show, the application may pull up a user interface for voting on the current show. As another example, if the user is listening to a particular song in the car, a shopping application may offer the user merchandise related to the singer (e.g., later when the user has stopped driving or is parked).

Continuing in block 450, the system displays the application to the user with the modified behavior. The application may run normally but a part of the application's interface or the application's main screen may be modified with contextually relevant information. The user may or may not be interested in performing the most contextually relevant task, so the application may allow the user to navigate away from the contextually relevant information and perform other actions. However, in the case that the user is interested in the contextually relevant information, the system helps the user get to that information and the application's related behavior faster. After block 450, these steps conclude.

In some embodiments, the application management system sorts applications in an application launcher of a computing device based on received contextual information. Just as application catalogs often have too many applications when a user is looking for new applications, a user's device can grow so filled with applications that it is difficult for the user to find an application the user is looking for. The system can sort applications based on the contextual information so that contextually relevant applications are displayed higher in a list of available applications to be run.

In some embodiments, the application management system modifies behavior of an application based on where the computing device on which the application is running is docked. For example, a tablet computer than can be docked in a car may behave differently when used as a tablet than when docked in the car and used for in-vehicle information. For example, some usage patterns may make less sense or be less safe in the car, particularly if the car is in motion. Thus, the application may limit what can be accessed or provide more voice input when the device is docked.

In some embodiments, the application management system is built into an operating system and provides application identification, installation, and execution using contextual information as described herein. The operating system sits at a sufficiently low level on the computing device to allow detection and carrying out of many of the circumstances described herein. The system may be implemented as an operating system component, service, driver, or other extension to improve the user experience of a particular device.

In some embodiments, the application management system hides applications that are not contextually relevant. In some cases, an application author may intend for an application only to be used when the user is engaged in certain activities. Thus, the author may not want the application to be run or displayed when the user is not performing these activities. An example is a voting application that is only valid during a specific portion of a television program. The application may only become available during a voting window determined by the program.

From the foregoing, it will be appreciated that specific embodiments of the application management system have been described herein for purposes of illustration, but that various modifications may be made without deviating from the spirit and scope of the invention. Accordingly, the invention is not limited except as by the appended claims.

We claim:

1. A computer-implemented method to search for applications considering contextual input information, the method comprising:

receiving contextual information that is related to a computing device and an activity that a user is engaged in;

accessing application manifest information for applications available from an application catalog;

accessing policy information that determines how to match accessed application manifest information to the received contextual information related to the device and user;

identifying one or more applications with manifest data that matches a currently detected context based on the accessed policy information;

ranking identified applications higher than other applications in the application catalog; and displaying applications to the user based on the modified ranking produced by considering contextual information, wherein the preceding steps are performed by at least one processor.

2. The method of claim 1 wherein receiving contextual information comprises receiving information from an event subsystem that notifies the system as new context information is available.

3. The method of claim 1 wherein receiving contextual information comprises receiving information from hardware or software components.

4. The method of claim 1 wherein receiving contextual information comprises receiving capability information of the computing device for installing and automatically configuring the application to run on the computing device.

5. The method of claim 1 wherein accessing application manifest information comprises information describing a purpose of the application and one or more contextual associations that are related to the application.

6. The method of claim 1 wherein accessing application manifest information comprises invoking an application-programming interface (API) through which the system can query the application manifest information.

7. The method of claim 1 wherein accessing policy information comprises receiving privacy policies that protect user information, organizational policies related to device compliance with legal or other regulations, or preferences of an administrator or user for handling contextual information during the process of searching for applications.

8. The method of claim 1 wherein accessing policy information comprises receiving default policy information if no more specific policy is available.

9. The method of claim 1 wherein identifying applications comprises searching for contextual associations of applications that match the detected user or device contextual information.

10. The method of claim 1 wherein ranking applications higher comprises applying a weighting to applications and weighting applications with a contextual relationship to the current context higher than other applications.

11. The method of claim 1 wherein displaying applications comprises helping the user to find applications in a potentially very large application catalog that are most relevant to the user at the current time, based either on the device the user is using to access the catalog, an activity the user is engaged in, or both.

12. A computer system for context aware application model for connected devices, the system comprising:

a processor and memory configured to execute software instructions embodied within the following components;

an application data store that provides a repository of applications from which a user can select applications to install on the user's computing device;

a context-detecting component that detects context information related to the computing device and one or more activities that the user is performing on the device;

an application manifest component that accesses and stores application manifest information associated with an application that describes contextual associations associated with the application;

an application identification component that identifies one or more applications for the user to install based on the detected user context information and the stored application manifest information;

an application installation component that installs a selected application and configures the application based on detected context information related to the computing device;

an application behavior component that modifies application behavior at run time based on detected context information; and a user interface component that provides a user interface through which the user or an application developer can interact with the system to configure how context information is used.

13. The system of claim 12 wherein the application data store includes contextual tags associated with each application that help users find the application in one or more contexts.

14. The system of claim 12 wherein the context detecting component provides an event subsystem whereby one or more hardware or software components can indicate context information that may be relevant to applications.

15. The system of claim 12 wherein the application manifest component stores one or more contextual tags with which context information from a requesting device can be matched to identify contextually relevant applications.

16. The system of claim 12 wherein the application installation component communicates specific hardware, input paradigms, output paradigms, and platform expectations to newly installed applications.

17. The system of claim 12 wherein the user interface component receives application metadata from an application developer that specifies a purpose of the application and contextual associations related to the application for storage in an application catalog.

18. A computer-readable storage memory comprising instructions for controlling a computer system to provide context aware application model for a computing device, wherein the instructions, upon execution, cause a processor to perform actions comprising:

providing a repository from which a user can select applications to install on the user's computing device;

detecting context information related to the computing device and one or more activities that the user is performing on the device;

accessing stored application manifest information associated with an application that describes contextual associations associated with the application;

identifying one or more applications for the user to install based on the detected user context information and the stored application manifest information;

installing a selected application and configures the application based on detected context information related to the computing device;

modifying application behavior at run time based on detected context information; and providing a user interface through which the user or an application developer can interact with the system to configure how context information is used.

19. The memory of claim 18 wherein modifying application behavior at run time based on detected context information comprises displaying information related to a content item the user is viewing on a set top box running the application.

20. The memory of claim 18 wherein modifying application behavior at run time based on detected context information comprises selecting a voice-based user interface upon detecting that the application is running in an automotive computing device.

* * * * *